United States Patent
Krieger et al.

(10) Patent No.: US 6,568,500 B1
(45) Date of Patent: May 27, 2003

(54) STEERING SYSTEM SHUDDER CONTROL

(75) Inventors: Clifford P. Krieger, Dryden, MI (US); Steven A. Wozniak, Wald Lake, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/010,234

(22) Filed: Dec. 6, 2001

(51) Int. Cl.⁷ .............................. B62D 5/08; B62D 5/00; F16D 31/02
(52) U.S. Cl. ................. 180/442; 180/441; 60/494; 60/469
(58) Field of Search .................. 60/469, 494; 180/417, 180/432, 433, 434, 441, 442, 437, 403

(56) References Cited

U.S. PATENT DOCUMENTS

| | | | |
|---|---|---|---|
| 3,233,408 A | * 2/1966 | Markert et al. | 60/469 |
| 5,385,329 A | 1/1995 | Phillips | 251/77 |
| 5,475,976 A | * 12/1995 | Phillips | 60/469 |
| 5,582,006 A | * 12/1996 | Phillips | 60/469 |
| 5,600,955 A | 2/1997 | Sahinkaya | 60/469 |
| 5,775,361 A | 7/1998 | Phillips | 137/115.11 |
| 6,152,254 A | * 11/2000 | Phillips | 180/422 |
| 6,370,459 B1 | * 4/2002 | Phillips | 180/443 |

* cited by examiner

*Primary Examiner*—Lesley D. Morris
*Assistant Examiner*—Matthew Luby
(74) *Attorney, Agent, or Firm*—Reising, Ethington, Barnes, Kisselle & Learman, P.C.

(57) ABSTRACT

A hydraulic power steering system includes a steering gear having a cylinder, and a piston slidably disposed in the cylinder to divide the cylinder into first and second cavities on opposed sides of the piston. A pair of turn tubes are coupled to the cylinder for connecting the cylinder cavities to a source of hydraulic fluid. An open fluid leakage path extends between the cylinder cavities or between the turn tubes. This open leakage path is sized to damp fluid pressure fluctuations and thereby reduce fluid-induced shudder in the steering system. The open fluid leakage path may comprise a valve or a passage extending between the turn tubes, a passage in the piston or in the seal between the piston and the gear housing cylinder, or a passage in a banjo block connected across the turn tube inputs to the gear housing.

6 Claims, 1 Drawing Sheet

STEERING SYSTEM SHUDDER CONTROL

The present invention is directed to control of shudder in a power steering system caused by transient lightly damped pressure pulsations in the hydraulic steering fluid, and more particularly to reducing power steering system shudder by damping such fluid pressure pulsations.

BACKGROUND AND SUMMARY OF THE INVENTION

Steering shudder is caused by a transient energy spike in the hydraulic steering circuit which oscillates the hydraulic fluid. The time duration of the oscillation (vibration) depends upon the fluid damping. Lightly damped circuits vibrate for a longer time. This invention adds fluid damping to a hydraulic power steering system by creating a leakage across the piston of the steering gear cylinder.

A hydraulic power steering system in accordance with the presently preferred embodiments of the invention includes a steering gear having a cylinder, and a piston slidably disposed in the cylinder to divide the cylinder into first and second cavities on opposed sides of the piston. A pair of turn tubes are coupled to the cylinder for connecting the cylinder cavities to a source of hydraulic fluid. An open fluid leakage path extends between the cylinder cavities or between the turn tubes. This open leakage path is sized to damp fluid pressure fluctuations and thereby reduce fluid-induced shudder in the steering system. In the illustrated embodiments of the invention, the open fluid leakage path may comprise a valve or a passage extending between the turn tubes, a passage in the piston or in the seal between the piston and the gear housing cylinder, or a passage in a banjo block connected across the turn tube inputs to the gear housing.

BRIEF DESCRIPTION OF THE DRAWING

The invention, together with additional objects, features and advantages thereof, will be best understood from the following description, the appended claims and the accompanying drawing in which:

DETAILED DESCRIPTION OF PREFERRED EMBODIMENTS

Figure 1:
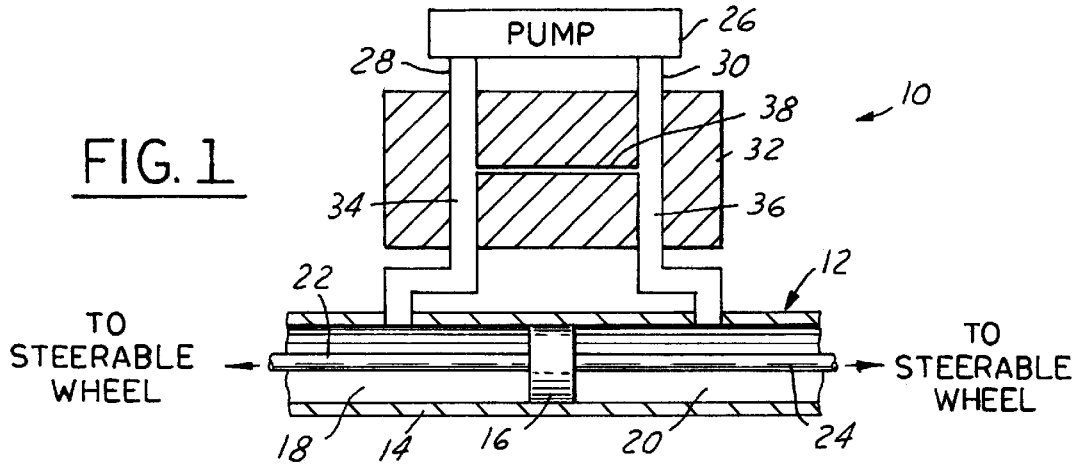
FIG. 1 is a schematic diagram of an automotive steering system shudder control arrangement in accordance with one presently preferred embodiment of the invention.

FIG. 1 illustrates an automotive power steering system 10 in accordance with a presently preferred embodiment of the invention as comprising a steering gear 12 composed of a housing cylinder 14 and a piston 16 slidable within the cylinder. Piston 16 thus divides cylinder 14 into a pair of hydraulic cylinder cavities 18, 20 on opposed sides of the piston. Rods or links 22, 24 extend from piston 16 through suitable seals (not shown) at the ends of cylinder 14 for connection to steerable wheels on the vehicle. A conventional rack-and-pinion gear arrangement can be connected to link 22 or 24 and responsive to a vehicle operator for selective manual control of vehicle wheel movement in the usual manner. A hydraulic system including a pump 26 is connected to cylinder cavities 18, 20 through turn tubes 28, 30 for providing hydraulic power steering assistance Pump 26 may be hydrostatic or hydrodynamic, and may include control valves or the like connected to control flow of fluid to and from the turn tubes.

Figure 2:
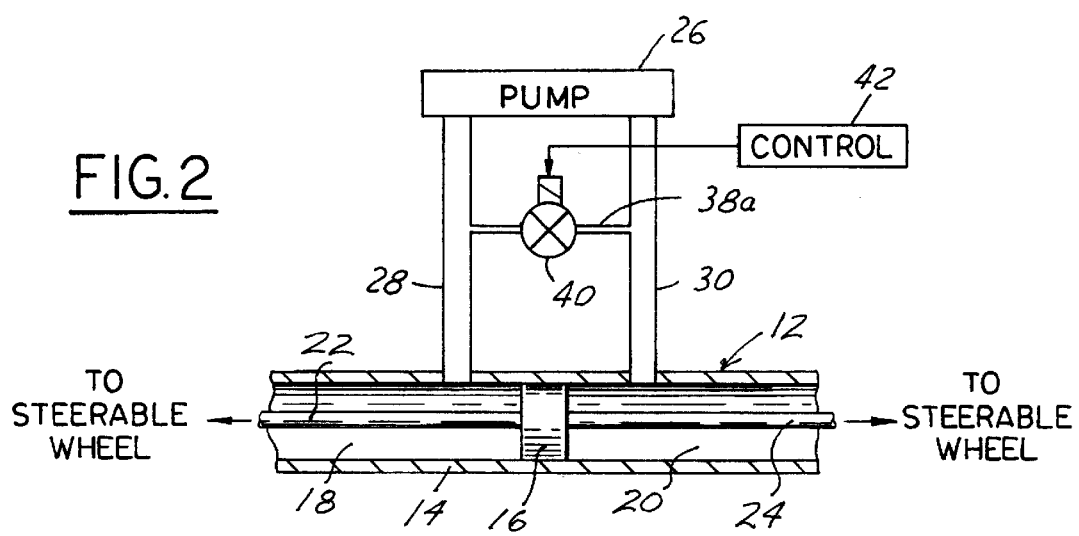
FIGS. 2 and 3 are schematic diagrams of respective modified embodiments of the invention.
Figure 3:
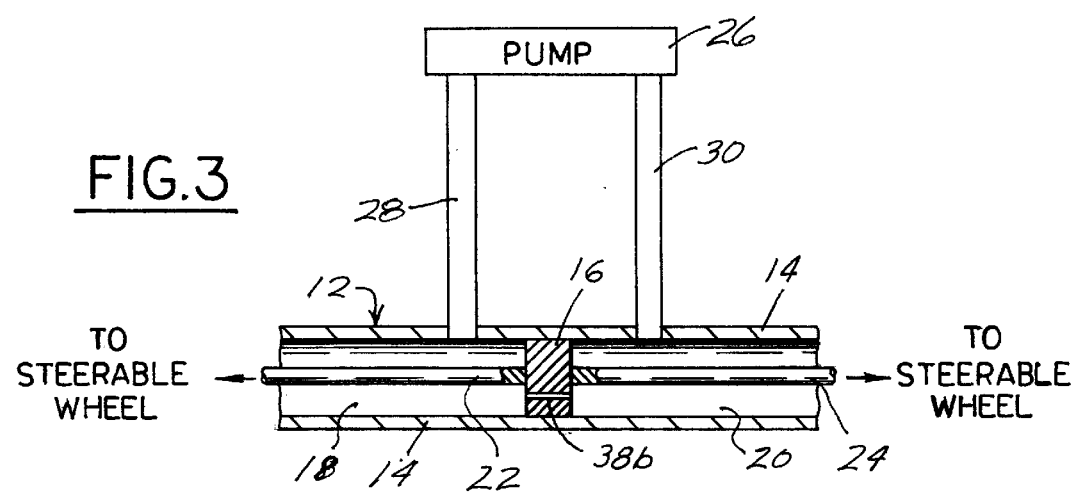

In accordance with the present invention, an open fluid leakage path extends between cavities 18, 20 or between turn tubes 28, 30. This open fluid leakage path is sized to damp fluid pressure fluctuations between the cylinder cavities and the turn tubes, and thereby reduce fluid-induced shudder in power steering system 10. In the embodiment of FIG. 1, such open fluid leakage path is disposed in a block 32 having passages 34, 36 for connecting cylinder cavities 18, 20 to turn tubes 28, 30. Block 32 may be a separate connector block as illustrated in FIG. 1, or may comprise a banjo block externally mounted on housing cylinder 14. An open passage 38 extends within block 32 between passages 34, 36 to provide the open fluid leakage path that characterizes the present invention. In the embodiment of FIG. 2, a passage 38a extends between turn tubes 28, 30, and a solenoid valve 40 is connected to control flow of fluid through passage 38a. Solenoid of valve 40 is connected to suitable control electronics 42 for selectively controlling the effective cross sectional size of the passage. Control 42 may include sensors, for example, for sensing the presence of shudder within the steering system and automatically controlling the size of the passage through valve 40 to reduce or suppress such shudder. In the embodiment of FIG. 3, an open fluid leakage path 38b extends across piston 16, either by extending through the body of the piston itself or through the seal between the piston and the opposing internal surface of gear housing cylinder 14.

Open fluid passage 38, 38a or 38b is an orifice-size passage, preferably having an effective cross sectional diameter to fluid flow of at least about 0.006 inch. In one embodiment of the form of the invention illustrated in FIG. 1 tested on a specific vehicle platform, passage 38 had a diameter of 0.016 inch. Different cross sectional sizes can be employed for optimizing suppression of pressure fluctuation and reducing steering shudder in different vehicle platform designs. Indeed, an important feature of the present invention is that the overall steering system can be tailored and optimized to different vehicle platform dynamic fluid characteristics merely by changing the size of the flow passage, or by providing multiple flow passages of differing diameters and/or lengths.

There has thus been disclosed an automotive power steering system shudder control arrangement that fully satisfies all of the objects and aims previously set forth. A number of modifications have been discussed, and other modifications and variations will readily suggest themselves to persons of ordinary skill in the art in view of the foregoing description. The invention is intended to embrace all such modifications and variations as fall within the spirit and broad scope of the appended claims.

What is claimed is:

1. A hydraulic power steering system that includes:

a steering gear having a cylinder, and a piston slidably disposed therein and dividing said cylinder into first and second cylinder cavities on opposed sides of said piston, a pair of turn tubes for connecting said cavities to a source of hydraulic fluid, and an open fluid leakage path extending between said cavities or between said turn tubes, said open fluid leakage path being sized to damp fluid pressure fluctuations and thereby reduce fluid-induced shudder in said system.

2. The system set forth in claim 1 wherein said open fluid leakage path extends across said piston within said cylinder between said cavities.

3. The system set forth in claim 1 further comprising a block having internal passages for connecting said cavities to said turn tubes, said open fluid leakage path extending within said block between said passages.

4. The system set forth in claim 1 further comprising a solenoid valve in said open fluid leakage path for selectively controlling cross sectional size of said path.

5. The system set forth in claim 1 wherein said fluid leakage path is continuously open to fluid leakage.

6. The system set forth in claim 5 wherein at least a portion of said path has a cross sectional diameter of about 0.006 to 0.016 inch.

* * * * *